(12) United States Patent
Chen

(10) Patent No.: US 12,443,650 B2
(45) Date of Patent: Oct. 14, 2025

(54) WALLPAPER IMAGE GENERATION METHOD AND ELECTRONIC DEVICE

(71) Applicant: ASUSTeK COMPUTER INC., Taipei (TW)

(72) Inventor: Cheng-Ming Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 370 days.

(21) Appl. No.: 17/994,011

(22) Filed: Nov. 25, 2022

(65) Prior Publication Data

US 2024/0104134 A1 Mar. 28, 2024

(30) Foreign Application Priority Data

Sep. 27, 2022 (TW) .................................. 111136512

(51) Int. Cl.
*G06V 10/764* (2022.01)
*G06F 16/535* (2019.01)
*G06F 16/538* (2019.01)
*G06V 10/776* (2022.01)

(52) U.S. Cl.
CPC .......... *G06F 16/535* (2019.01); *G06F 16/538* (2019.01); *G06V 10/776* (2022.01)

(58) Field of Classification Search
CPC ... G06F 16/535; G06F 16/538; G06V 10/776; G06V 10/26; G06V 10/774; G06V 10/82; G06V 10/764
See application file for complete search history.

(56) References Cited

U.S. PATENT DOCUMENTS

| 11,513,753 B2 * | 11/2022 | Hao ...................... G06F 3/0488 |
| 2015/0055879 A1 | 2/2015 | Yang |
| 2015/0334219 A1 * | 11/2015 | Soundararajan .. H04M 1/72403 |
| | | 455/414.1 |

FOREIGN PATENT DOCUMENTS

| CN | 110209460 | | 9/2019 | |
| CN | 110287421 | | 9/2019 | |
| CN | 112308939 | | 2/2021 | |
| CN | 110489582 B | * | 11/2023 | ............. G06F 16/54 |
| WO | WO-2022199470 A1 | * | 9/2022 | ............. G06F 9/451 |

* cited by examiner

*Primary Examiner* — Bobbak Safaipour
*Assistant Examiner* — Dylan J Sherrillo
(74) *Attorney, Agent, or Firm* — JCIPRNET

(57) ABSTRACT

A wallpaper image generation method and an electronic device are provided in this disclosure. The wallpaper image generation method includes: collecting personalized information from the electronic device; generating feature description information according to the personalized information, wherein the feature description information includes description information belonging to at least one information category; selecting, automatically, a target image file from an image file database according to the feature description information; and generating a wallpaper image according to the target image file.

12 Claims, 3 Drawing Sheets

WALLPAPER IMAGE GENERATION METHOD AND ELECTRONIC DEVICE

CROSS-REFERENCE TO RELATED APPLICATION

This application claims the priority benefit of Taiwan application serial no. 111136512, filed on Sep. 27, 2022. The entirety of the above-mentioned patent application is hereby incorporated by reference herein and made a part of this specification.

BACKGROUND

Technical Field

The disclosure relates to a wallpaper image generation method and an electronic device.

Description of Related Art

Most smartphones, tablet computers, or personal computers support the function of wallpaper setting and replacement, allowing users to manually select the wallpaper to be set on the homepage or desktop. For some users, manually changing the wallpaper is troublesome, yet it would be tedious not to update it. In addition, some devices allow users to pre-select multiple wallpapers for alternate settings but still require the user to manually select the wallpaper image to be added to a schedule, which is really annoying for some users.

SUMMARY

According to the first aspect of this disclosure, a wallpaper image generation method for an electronic device is provided. The wallpaper image generation method includes: collecting personalized information from the electronic device; generating feature description information according to the personalized information, where the feature description information includes description information belonging to at least one information category; selecting, automatically, a target image file from an image file database according to the feature description information; and generating a wallpaper image according to the target image file.

According to the second aspect of this disclosure, an electronic device is provided. The electronic device includes a storage circuit and a processor. The processor is coupled to the storage circuit. The processor is configured to: collect personalized information from the electronic device and store the personalized information in the storage circuit; generate feature description information according to the personalized information, where the feature description information includes description information belonging to at least one information category; select, automatically, a target image file from an image file database according to the feature description information; and generate a wallpaper image according to the target image file.

Based on the above, after personalized information is collected from the electronic device, feature description information may be generated according to the personalized information. In particular, the feature description information may include description information belonging to at least one information category. Afterwards, the target image file may be selected, automatically, from the image file database according to the feature description information. Thereby, generation efficiency of the wallpaper image may be effectively improved.

DESCRIPTION OF THE EMBODIMENTS

Figure 1:
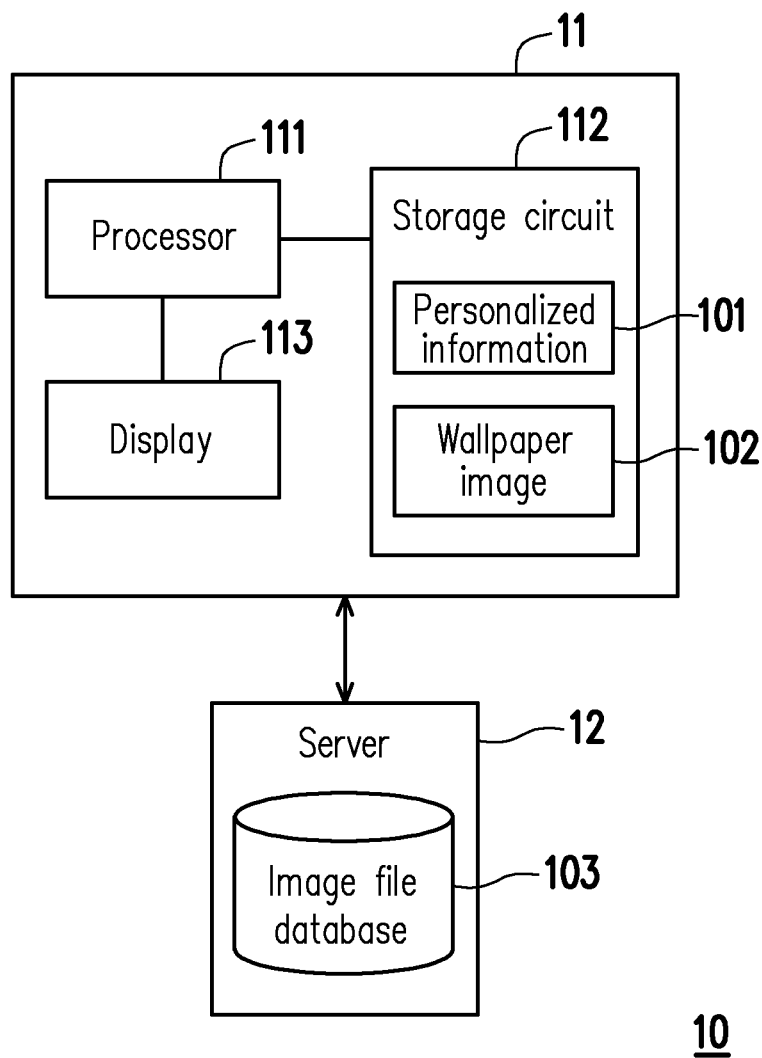
FIG. 1 is a schematic view of a wallpaper image generation system according to an embodiment of the disclosure.

Referring to FIG. 1, the wallpaper image generation system 10 includes an electronic device 11 and a server 12. The electronic device 11 may include various electronic devices with functions of data transmission, data processing, and image display, such as a smartphone, a tablet computer, a notebook computer, a desktop computer, an industrial computer, a server host, or a multimedia business machine. The type of the electronic device 11 is not limited thereto. The server 12 may be connected to the electronic device 11 for communication. For example, the server 12 may include the various types of electronic devices described above and serve as the server host, and the type of the server 12 is not limited thereto. Alternatively, in an embodiment, the electronic device 11 and the server 12 may also be implemented as a single device, which is not limited in the disclosure.

The electronic device 11 includes a processor 111, a storage circuit 112, and a display 113. The processor 111 is responsible for the whole or a part of the operation of the electronic device 11. For example, the processor 111 may include a central processing unit (CPU) or other programmable general-purpose or special-purpose microprocessor, a digital signal processor (DSP), a programmable controller, an application specific integrated circuit (ASIC), a programmable logic device (PLD), or other similar devices, or a combination of these devices.

The storage circuit 112 is coupled to the processor 111 for storing data. For example, the storage circuit 112 may include a volatile storage circuit and a non-volatile storage circuit. The volatile storage circuit is configured to volatilely store data. For example, the volatile storage circuit may include random access memory (RAM) or similar volatile storage media. The non-volatile storage circuit is configured to non-volatilely store data. For example, the non-volatile storage circuit may include read only memory (ROM), solid state disk (SSD), conventional hard disk drive (HDD), flash memory, embedded multimedia card (eMMC), universal flash storage (UFS) device, or similar non-volatile storage media.

The display 113 is coupled to the processor 111 for displaying image. For example, the display 113 may include a plasma display, a liquid-crystal display (LCD), a thin film transistor liquid crystal display (TFT-LCD), an organic light-emitting diode (OLED), and light-emitting diode display (LED display), etc., and the type of display 11 is not limited to thereto. In addition, the electronic device 11 may also include a power management circuit and various input/output devices, such as a network interface card, a temperature sensor, a mouse, a keyboard, a touch panel, a speaker, and/or a microphone, and the type of the input/output devices is not limited thereto.

The processor 111 may collect personalized information 101 from the electronic device 11 and store the personalized information 101 in the storage circuit 112. For example, the personalized information 101 may include information collected through various sensors (e.g., a temperature sensor and/or a gravity sensor) of the electronic device 11, the information collected from the Internet via the network interface card of the electronic device 11, and/or the information set by the user of the electronic device 11. In addition, the personalized information 101 may also include any information that may be collected through the electronic device 11 (e.g., a system time), which is not limited in the disclosure.

In an embodiment, the personalized information 101 may include device information. For example, the device information may include at least one of time information, weather information, date information, and temperature information. The time information may reflect the time of the current region where the electronic device 11 is located. The weather information may reflect the weather of the current region where the electronic device 11 is located. The date information may reflect the date of the current region where the electronic device 11 is located. The temperature information may reflect the temperature of the current region where the electronic device 11 is located. It should be noted that the device information may also include any information that may be collected through various sensors of the electronic device 11 and/or information collected from the Internet through the network interface card of the electronic device 11, which will not be repeated herein.

In an embodiment, the personalized information 101 may also include user information. For example, the user information may include at least one of gender information, age information, and birthday information. The gender information may reflect the gender of the user of the electronic device 11. The age information may reflect the age of the user of the electronic device 11. The birthday information may reflect the birthday of the user of the electronic device 11. For example, the user information may be set by the user of the electronic device 11 or obtained from the user's social media account or similar channels through the Internet. It should be noted that the user information may also include any personal information (i.e., preferences or interests, etc.) that is set by the user of the electronic device 11 or obtained from the user's social media account or similar channels through the Internet, which will not be repeated herein.

The processor 111 may generate feature description information according to the personalized information 101. In particular, the feature description information may include description information belonging to at least one information category. For example, the at least one information category may include time, weather, date, temperature, age, gender, and/or birthday, etc., and the at least one information category is not limited thereto.

In an embodiment, the processor 111 may refer to Table 1 below to convert different types of personalized information into description information of a specific information category. Taking the time information as an example, the processor 111 may determine that the target information category to which the time information belongs is "time". Next, the processor 111 may refer to Table 1 to convert the time information into description information that conforms to the target information category of "time", such as "daytime", "nighttime", "breakfast time", "lunch time", "dinner time". Alternatively, taking the gender information as an example, the processor 111 may determine that the target information category to which the gender information belongs is "gender". Next, the processor 111 may refer to Table 1 to convert the gender information into description information that conforms to the target information category of "gender", such as "male" or "female".

TABLE 1

| Information Category | Description Information |
| --- | --- |
| Time | Daytime, nighttime, breakfast time, lunch time, dinner time |
| Weather | Sunny, cloudy, or rainy |
| Date | Working days, weekends, or specific holidays |
| Temperature | Cold, cool, or warm |
| Gender | Male or female |
| Age | Children, teens, adults, or seniors |
| Birthday | Birthday person |

In an embodiment, the image file database 103 may store multiple image files, and the disclosure does not limit the total number and/or types of the image files in the image file database 103. For example, the image file database 103 is stored in the server 12 for access by an external electronic device (e.g., the electronic device 11).

After obtaining the feature description information, the processor 111 may automatically select one or more image files (also referred to as target image files) from the image file database 103 according to the feature description information. Then, the processor 111 may generate one or more wallpaper images 102 according to the target image file.

In an embodiment, each or at least some of the image files in the image file database 103 have a marking (also referred to as image file marking). The image file marking of a certain image may correspond to or reflect the type of the image. For example, if the image content presented by a certain image file is a rainy street at night, the markings assigned to this image file may reflect that type of this image file are "night" and "rainy day". Alternatively, if the image content presented by a certain image file is an adult male celebrating his birthday during the day, the markings assigned to this image file may reflect that the type of this image file are "daytime," "male," "adult," "birthday person," and so on.

In an embodiment, the processor 111 may determine one or more image file markings (also referred to as target image file marking) according to the obtained feature description information. Next, the processor 111 may query the server 12 whether there is an image file with the target image file marking in the image file database 103. In response to a specific image (also referred to as the first image file) in the image file database 103 having the target image file marking, the processor 111 may determine a first image file as the target image file (or one of multiple target image files). On the contrary, an image file (also referred to as the second image file) that does not have the target image file marking in the image file database 103 will not be determined as the target image file by the processor 111.

For example, if the currently determined target image file markings are "night" and "rainy day", the processor 111 may request the server 12 to download an image file with the target image file markings (i.e., "night" and "rainy day") as the target image file. According to the request from the processor 111, if the server 12 determines that the image file markings of two images in the image file database 103 are "night" and "rainy day", respectively, the server 12 may transmit the two image files with the target image file markings (i.e., the first image files) to the processor 111 (or the electronic device 11) as the target image files. Then, the processor 111 may generate a wallpaper image 102 according to the two image files. It should be noted that the total number of target image files used to generate a single wallpaper image 102 may be one or more, which is not limited in the disclosure.

In an embodiment, if the total number of target image files used to generate the wallpaper image 102 is one, the processor 111 may directly set the target image file as the wallpaper image 102 of the electronic device 11. In an embodiment, if the total number of target image files used to generate a single wallpaper image 102 is multiple, the processor 111 may perform image cropping and image splicing of specific image regions on these target image files (e.g., cropping images in different image regions in different image files and splicing them into a single image) to generate the wallpaper image 102. For example, if different types of sun patterns, different types of weather backgrounds, and/or different types of people are presented in multiple target image files, the processor 111 may extract the required image parts from these target image files and splice the same into a single wallpaper image.

In an embodiment, the total number of the wallpaper images 102 generated according to the target image file may also be multiple. If the total number of the wallpaper images 102 is multiple, these wallpaper images 102 may be added to a schedule. After being added to the schedule, these wallpaper images 102 may be automatically set as the wallpaper of the electronic device 11 and presented by the display 113 in turn.

In an embodiment, the processor 111 may use training data and verification data to train one or more predictive models to update decision logic of the predictive models. For example, the predictive model may include artificial intelligence (AI) models such as a deep learning model and/or a machine learning model. The predictive model may be stored in a storage circuit 12. The training data may include a large amount of feature description information for training. In the process of training the predictive model, the predictive model may perform feature analysis (e.g., feature vector analysis) on the feature description information and generate a decision result according to the internal decision logic thereof. The decision result may reflect the information category of a certain training data (i.e., the feature description information) determined by the predictive model. The processor 111 may use the verification data to verify the decision result of the predictive model on the training data. According to the correctness of the decision result of the predictive model, the processor 111 may continuously update (e.g., adjust) the decision logic of the predictive model. Thereby, the decision-making efficiency of the predictive model may be gradually improved. It should be noted that those with ordinary skills in the art to which they belong should be able to know how to train the predictive model to improve the decision-making efficiency thereof according to the above description, and are not repeated herein.

After completing the training of the predictive model, the processor 111 may generate the target image file marking through the predictive model. For example, after generating the corresponding feature description information according to the personalized information 101, the processor 111 may input the feature description information into the trained predictive model. The predictive model may analyze the feature description information and generate a corresponding decision result. The decision result may reflect the information category of the feature description information determined by the predictive model. Then, the processor 111 may determine the target image file marking corresponding to the information category according to an output of the predictive model. For example, if the decision result of the predictive model reflects that the information category of the feature description information is "night", the processor 111 may generate a target image file marking corresponding to the information category "night" according to the output of the predictive model.

In an embodiment, the processor 111 may also generate target image file markings corresponding to specific feature description information based on multiple default rules. For example, the processor 111 may store one or more rules tables in the storage circuit 112 in advance. The rules table may record multiple default rules. Each of the default rules may be used to convert or map specific feature description information (or a combination of feature description information) into a corresponding target image file marking (or a combination of target image file markings). Afterwards, the processor 111 may query the rules table according to specific feature description information (or a combination of feature description information) and determine the target image file marking (or a combination of target image file markings) corresponding to the feature description information (or a combination of feature description information) according to the query result.

Figure 2:
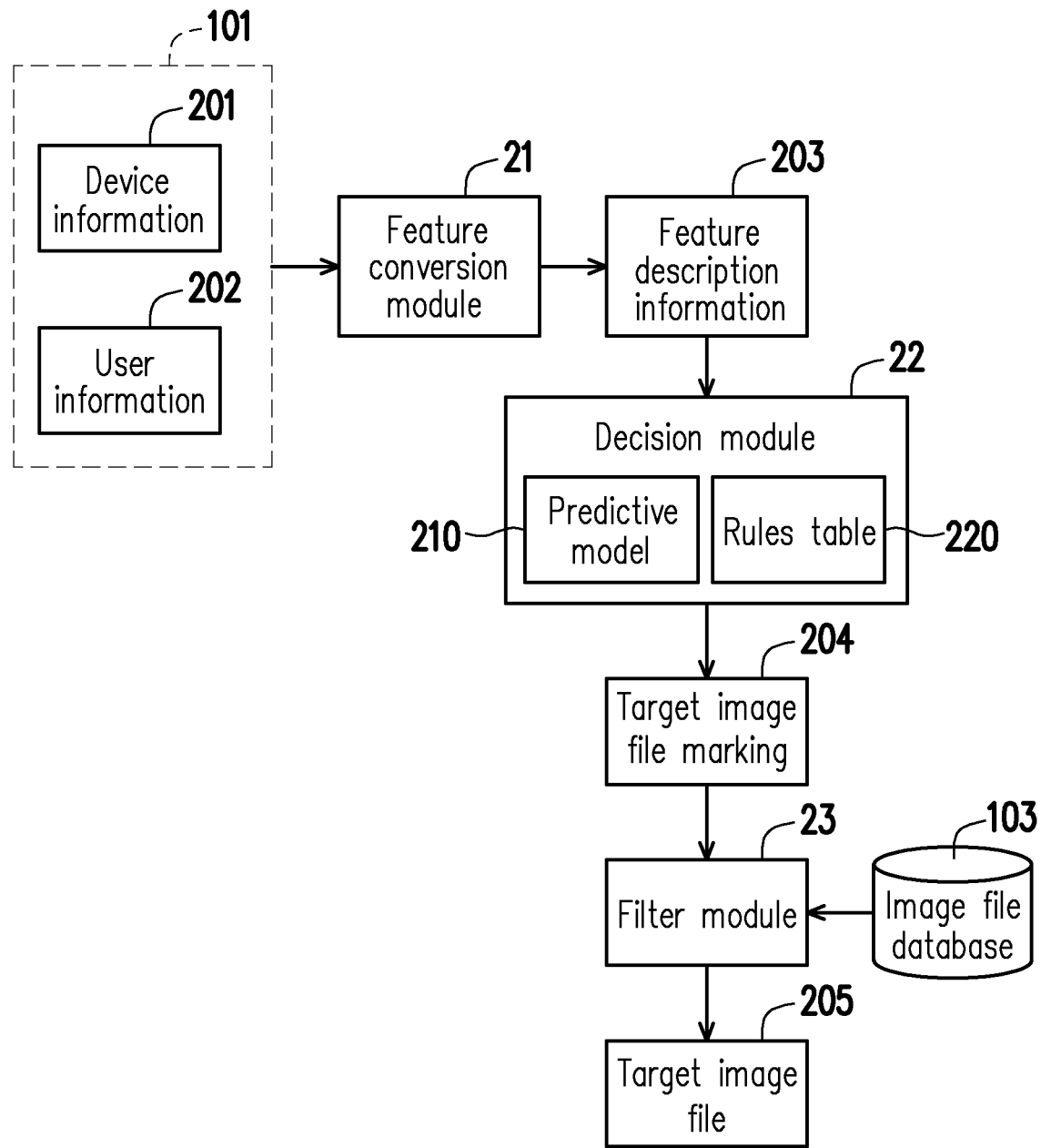
FIG. 2 is a schematic view of an operation flow of generating a wallpaper image according to an embodiment of the disclosure.

Referring to FIG. 1 and FIG. 2, the personalized information 101 includes device information 201 and user information 202. The device information 201 may include time information, weather information, date information, temperature information, etc., collected through various sensors (e.g., a temperature sensor and/or a gravity sensor) of the electronic device 11 and/or information collected from the Internet through the network interface card of the electronic device 11. The user information 202 may include gender information, age information, and/or birthday information, etc., set by the user of the electronic device 11 and/or collected from the Internet via the network interface card of the electronic device 11. The details of how to obtain the device information 201 and the user information 202 are described above and will not be repeated herein.

The processor 11 may run a feature conversion module 21 to convert the personalized information 101 into feature description information 203. For example, the feature conversion module 21 may determine the target information category to which the personalized information 101 belongs, and convert the personalized information 101 into description information that conforms to the target information category with reference to Table 1 above. The operation details of how to generate the feature description information are described above and will not be repeated herein.

After obtaining the feature description information 203, the processor 11 may run a decision module 22 to determine a target image file marking 204 according to the feature description information 203. For example, the decision module 22 may include at least one of a predictive model 210 and a rules table 220. In an embodiment, the processor 11 may analyze the feature description information 203 through the predictive model 210 to obtain the target image file marking 204. For example, the predictive model 210 may analyze the feature description information 203 and generate a corresponding decision result. The decision result may reflect the information category of the feature description information 203 determined by the predictive model 210. Then, the processor 111 may determine the target image file marking 204 corresponding to the information category according to an output of the predictive model 210. Alternatively, in an embodiment, the processor 11 may query the rules table 220 according to the feature description information 203 and determine the target image file marking 204 corresponding to the feature description information 203 according to the query result. The operation details of how to generate the target image file marking are described above and will not be repeated herein.

After obtaining the target image file marking 204, the processor 11 may run a filter module 23 to automatically select a target image file 205 from the image file database 103 according to the target image file marking 204. The total number of the target image file 205 may be one or more. For example, the processor 11 may select an image file that also has the target image file marking 204 from the image file database 103 as the target image file 205 by comparing the image file markings. The operation details of how to select the target image file are described above and will not be repeated herein.

After obtaining the target image file 205, the processor 111 may generate the wallpaper image 102 according to the target image file 205. For example, the processor 111 may directly set the target image file 205 as the wallpaper image 102 through a desktop application program or an operating system (OS) of the electronic device 11. Alternatively, the processor 111 may also generate the wallpaper image 102 by performing image cropping and image splicing on the target image file 205. The operation details of how to generate the wallpaper image 102 are described above and will not be repeated herein. After obtaining the wallpaper image 102, the processor 111 may instruct the display 113 to present the wallpaper image 102 as a wallpaper on the user interface (UI) of the electronic device 11.

In an embodiment, the processor 111 may update the target image file 205 automatically according to FIG. 2 or other similar operation flow in response to a change in personalized information 101. Thereby, no matter how the current environment of the electronic device 11 changes, the processor 111 may automatically extract the corresponding target image file 205 from the image file database 103, and then update the wallpaper image 102 according to the new target image file 205. For example, if the location of the electronic device 11 is raining in the morning, the processor 111 may correspondingly set the wallpaper image 102 of the electronic device 11 as an image including a raining situation according to FIG. 2 or other similar operation flow to reflect the current rainy weather. When the weather clears in the afternoon, the processor 111 may also update the wallpaper image 102 of the electronic device 11 to an image including a sunny day situation according to FIG. 2 or other similar operation flow correspondingly, so as to reflect the current sunny weather. At the same time, whether it is rainy or sunny, the wallpaper image 102 may also present a corresponding image according to other personalized information 101. For example, showing an adult woman walking in the rain or under the sun, etc., to reflect the status of the current user of the electronic device 11 and/or the status or change of the environment where the electronic device 11 is located.

It should be noted that the feature conversion module 21, the decision module 22, and/or the filter module 23 in the embodiment of FIG. 2 may be implemented in software or hardware respectively, which is not limited in the disclosure. For example, if the feature conversion module 21, the decision module 22, and/or the filter module 23 are implemented in software, then the feature conversion module 21, the decision module 22, and/or the filter module 23 may be stored in the storage circuit 12 of FIG. 1 or other storage media for the execution of the processor 111. Alternatively, if the feature conversion module 21, the decision module 22, and/or the filter module 23 are implemented in hardware, then the circuit module of feature conversion module 21, decision module 22, and/or filter module 23 may be disposed inside the processor 111 or independently from the processor 111, which is not limited in the disclosure.

Figure 3:
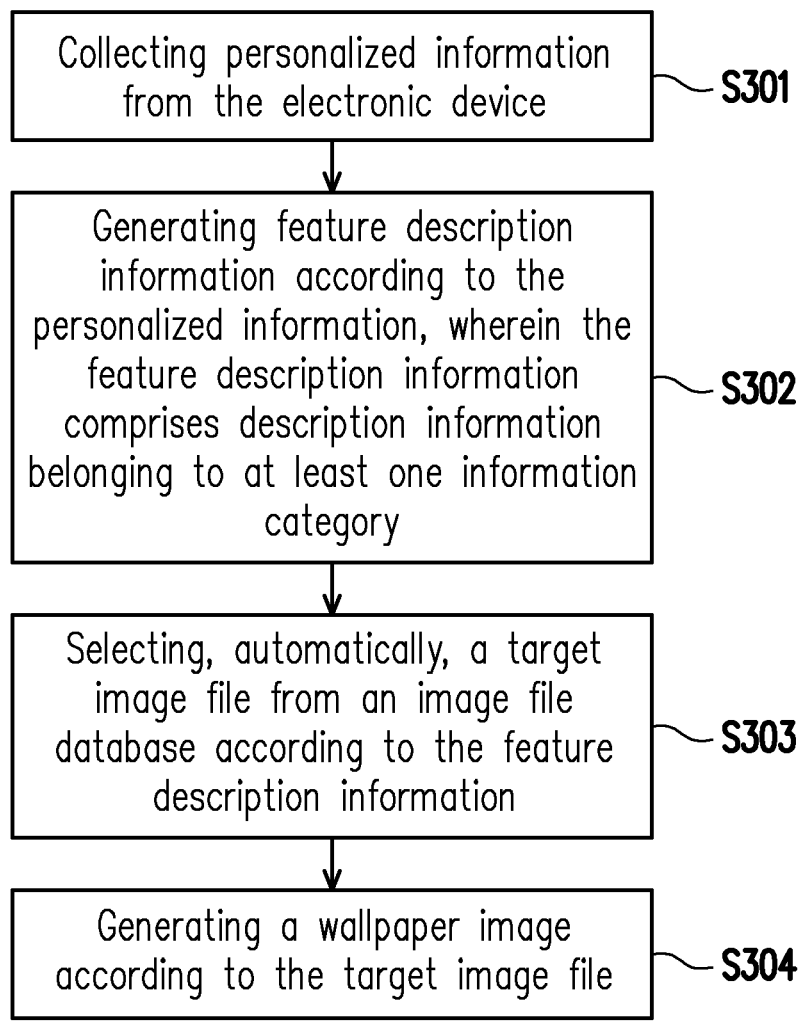
FIG. 3 is a flow chart of a wallpaper image generation method according to an embodiment of the disclosure.

Referring to FIG. 3, in step S301, personalized information is collected from the electronic device. In step S302, feature description information is generated according to the personalized information, where the feature description information includes description information belonging to at least one information category. In step S303, a target image file is selected automatically from an image file database according to the feature description information. In step S304, a wallpaper image is generated according to the target image file.

However, each step in FIG. 3 has been described in detail as above, and are not repeated herein. It should be noted that each of the steps in FIG. 3 may be implemented as multiple program codes or circuits, and the disclosure is not limited thereto. In addition, the method in FIG. 3 may be used in conjunction with the above-mentioned exemplary embodiments, or may be used alone, and the disclosure is not limited thereto.

To sum up, the wallpaper image of traditional electronic devices such as smartphones is either a default wallpaper image or a manual choice by the user. However, in the disclosure, a wallpaper image corresponding to the current environment status and/or user status is automatically generated according to the personalized information collected from the electronic device, thereby effectively improving the generation efficiency of the wallpaper image. In addition, by automatically generating and replacing the wallpaper image, users who usually have difficulty making a choice are assisted in replacing the wallpaper image, which effectively improves the user experience.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A wallpaper image generation method for an electronic device, the wallpaper image generation method comprises:
    collecting personalized information from the electronic device, wherein the personalized information comprises at least one of gender information of a user of the electronic device, age information of the user, and personal information obtained through social media account of the user;
    generating feature description information according to the personalized information, wherein the feature description information comprises description information belonging to at least one information category;
    selecting, automatically, a target image file having a target image file marking corresponding to the feature description information from an image file database; and
    generating a wallpaper image according to the target image file.

2. The wallpaper image generation method according to claim 1, wherein the personalized information comprises device information and user information, the device information comprises at least one of time information, weather information, date information, and temperature information, and the user information comprises at least one of the gender information, the age information, and birthday information.

3. The wallpaper image generation method according to claim 1, wherein generating the feature description information according to the personalized information comprises:
   determining a target information category to which the personalized information belongs; and
   converting the personalized information into description information that conforms to the target information category.

4. The wallpaper image generation method according to claim 1, wherein selecting, automatically, the target image file having the target image file marking corresponding to the feature description information from the image file database comprises:
   determining the target image file marking based on the feature description information; and
   determining a first image file as the target image file in response to the first image file in the image file database comprising the target image file marking.

5. The wallpaper image generation method according to claim 4, wherein determining the target image file marking based on the feature description information comprises:
   using training data and verification data to train a predictive model to update decision logic of the predictive model;
   inputting the feature description information to the predictive model trained; and
   determining the target image file marking according to an output of the predictive model.

6. The wallpaper image generation method according to claim 1, further comprising:
   updating the target image file automatically in response to a change in the personalized information.

7. An electronic device, comprising:
   a storage circuit; and
   a processor, coupled to the storage circuit,
   wherein the processor is configured to:
   collect personalized information from the electronic device and store the personalized information in the storage circuit, wherein the personalized information comprises at least one of gender information of a user of the electronic device, age information of the user, and personal information obtained through social media account of the user;
   generate feature description information according to the personalized information, wherein the feature description information comprises description information belonging to at least one information category;
   select, automatically, a target image file having a target image file marking corresponding to the feature description information from an image file database; and
   generate a wallpaper image according to the target image file.

8. The electronic device according to claim 7, wherein the personalized information comprises device information and user information, the device information comprises at least one of time information, weather information, date information, and temperature information, and the user information comprises at least one of the gender information, the age information, and birthday information.

9. The electronic device according to claim 7, wherein an operation of generating the feature description information according to the personalized information comprises:
   determining a target information category to which the personalized information belongs; and
   converting the personalized information into description information that conforms to the target information category.

10. The electronic device according to claim 7, wherein an operation of selecting, automatically, the target image file having the target image file marking corresponding to the feature description information from the image file database comprises:
    determining the target image file marking based on the feature description information; and
    determining a first image file as the target image file in response to the first image file in the image file database comprising the target image file marking.

11. The electronic device according to claim 10, wherein an operation of determining a target image file marking based on the feature description information comprises:
    using training data and verification data to train a predictive model to update decision logic of the predictive model;
    inputting the feature description information to the predictive model trained; and
    determining the target image file marking according to an output of the predictive model.

12. The electronic device according to claim 7, wherein the processor is further configured to:
    update the target image file automatically in response to a change in the personalized information.

* * * * *